United States Patent
Kamvysselis

(10) Patent No.: US 7,249,193 B1
(45) Date of Patent: Jul. 24, 2007

(54) SRDF ASSIST

(75) Inventor: Peter Kamvysselis, Boston, MA (US)

(73) Assignee: EMC Corporation, Hopkinton, MA (US)

( * ) Notice: Subject to any disclaimer, the term of this patent is extended or adjusted under 35 U.S.C. 154(b) by 715 days.

(21) Appl. No.: 09/940,903

(22) Filed: Aug. 28, 2001

(51) Int. Cl.
G06F 15/16 (2006.01)

(52) U.S. Cl. .................... 709/237; 709/230; 709/246

(58) Field of Classification Search ............ 709/237, 709/231, 230, 246; 714/4, 7; 370/473, 282, 370/401; 711/207, 162
See application file for complete search history.

(56) References Cited

U.S. PATENT DOCUMENTS

| | | | |
|---|---|---|---|
| 5,206,939 A | 4/1993 | Yanai et al. | |
| 5,649,232 A * | 7/1997 | Bourekas et al. | 710/60 |
| 5,742,792 A * | 4/1998 | Yanai et al. | 711/162 |
| 5,778,394 A | 7/1998 | Galtzur et al. | |
| 5,784,373 A * | 7/1998 | Satake et al. | 370/402 |
| 5,845,147 A | 12/1998 | Vishlitzky et al. | |
| 5,857,208 A | 1/1999 | Ofek | |
| 6,122,629 A * | 9/2000 | Walker et al. | 707/8 |
| 6,157,962 A * | 12/2000 | Hodges et al. | 710/1 |
| 6,173,377 B1 * | 1/2001 | Yanai et al. | 711/162 |
| 6,282,172 B1 * | 8/2001 | Robles et al. | 370/230 |
| 6,359,882 B1 * | 3/2002 | Robles et al. | 370/389 |
| 6,415,373 B1 * | 7/2002 | Peters et al. | 711/167 |
| 6,421,280 B1 * | 7/2002 | Ellis | 365/189.05 |
| 6,442,169 B1 * | 8/2002 | Lewis | 370/401 |
| 6,445,717 B1 * | 9/2002 | Gibson et al. | 370/473 |
| 6,502,205 B1 * | 12/2002 | Yanai et al. | 714/7 |
| 6,536,000 B1 * | 3/2003 | Jackson et al. | 714/57 |
| 6,542,513 B1 * | 4/2003 | Franke et al. | 370/429 |
| 6,564,263 B1 * | 5/2003 | Bergman et al. | 709/231 |
| 6,567,735 B1 * | 5/2003 | Bortfeld et al. | 701/52 |
| 6,622,172 B1 * | 9/2003 | Tam | 709/232 |
| 6,625,621 B2 * | 9/2003 | Tan et al. | 707/201 |
| 6,643,750 B2 * | 11/2003 | Achiwa et al. | 711/162 |
| 6,718,481 B1 * | 4/2004 | Fair | 714/4 |
| 6,721,286 B1 * | 4/2004 | Williams et al. | 370/282 |
| 6,760,828 B1 * | 7/2004 | Black | 711/207 |

(Continued)

OTHER PUBLICATIONS

UltraNet Open Systems Gateway; http://www.cnt.com/products/gateways/un_open_systems_gateway.asp; May 23, 2001.

(Continued)

Primary Examiner—Rupal Dharia
Assistant Examiner—Kristie Shingles
(74) Attorney, Agent, or Firm—Muirhead and Saturnelli, LLC

(57) ABSTRACT

Transmitting data from a source to a destination, includes receiving the data from the source and providing the data to the destination using a network, where the data is acknowledged to the source as being successfully received at the destination prior to all of the data being provided to the network. The source may be a primary storage device. The destination may be a secondary storage device. The data may be provided from the source in a first format and may be provided to the network in a second format that is different from the first format where the first format may be RDF and the second format may be TCP/IP or UDP. The destination may receive the data in a first format different from a second format used to transmit the data over the network. The first format may be RDF and the second format may be TCP/IP or UDP.

9 Claims, 13 Drawing Sheets

U.S. PATENT DOCUMENTS

| | | | |
|---|---|---|---|
| 6,775,707 B1 * | 8/2004 | Bennett et al. | 709/233 |
| 6,957,268 B1 * | 10/2005 | Odom et al. | 709/232 |
| 2002/0004850 A1 * | 1/2002 | Sudarshan et al. | 709/313 |
| 2003/0149715 A1 * | 8/2003 | Ruutu et al. | 709/100 |
| 2005/0120093 A1 * | 6/2005 | Nakano et al. | 709/217 |

OTHER PUBLICATIONS

Portion of document titled: Ten Frequently Asked Questions Regarding Extended SRDF Solution from Computer Network Technology (CNT).

UltraNet Open Systems Gateway diagram; http://www.cnt.com/products/gateways/uosg_diagram.asp; May 23, 2001.

UltraNet Storage Director; www.cnt.com; 2000.

UltraNet Open Systems Gateway; www.cnt.com; 2000.

Data Replication Over IP Networks; www.cnt.com; 2000.

Data Replication Over IP Networks; Computer Network Technology Corporation; www.cnt.com; 2000.

RAIDing the Network; Computer Network Technology Corporation; www.cnt.com; 1999.

* cited by examiner

SRDF ASSIST

BACKGROUND OF THE INVENTION

1. Technical Field

This application relates to computer storage devices, and more particularly to communication between storage devices.

2. Description of Related Art

Host processor systems may store and retrieve data using a storage device containing a plurality of host interface units (host adapters), disk drives, and disk interface units (disk adapters). Such storage devices are provided, for example, by EMC Corporation of Hopkinton, Mass. and disclosed in U.S. Pat. No. 5,206,939 to Yanai et al., U.S. Pat. No. 5,778,394 to Galtzur et al., U.S. Pat. No. 5,845,147 to Vishlitzky et al., and U.S. Pat. No. 5,857,208 to Ofek. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may nor correspond to the actual disk drives. Allowing multiple host systems to access the single storage device unit allows the host systems to share data stored therein.

In some instances, it may be desirable to copy data from one storage device to another. For example, if a host writes data to a first storage device, it may be desirable to copy that data to a second storage device provided in a different location so that if a disaster occurs that renders the first storage device inoperable, the host (or another host) may resume operation using the data of the second storage device. Such a capability is provided, for example, by the Remote Data Facility (RDF) product provided by EMC Corporation of Hopkinton, Mass. With RDF, a first storage device, denoted the "primary storage device" is coupled to the host. One or more other storage devices, called "secondary storage devices" receive copies of the data that is written to the primary storage device by the host. The host interacts directly with the primary storage device, but any data changes made to the primary storage device are automatically provided to the one or more secondary storage devices using RDF. The primary and secondary storage devices may be connected by a data link, such as an ESCON link. The RDF functionality may be facilitated with an RDF adapter (RA) provided at each of the storage devices.

RDF allows synchronous data transfer where, after data written from a host to a primary storage device is transferred from the primary storage device to a secondary storage device using RDF, receipt is acknowledged by the secondary storage device to the primary storage device which then provides a write acknowledge back to the host. Thus, in synchronous mode, the host does not receive a write acknowledge from the primary storage device until the RDF transfer to the secondary storage device has been completed and acknowledged by the secondary storage device.

A drawback to the synchronous RDF system is that the latency of each of the write operations is increased by waiting for the acknowledgement of the RDF transfer. This problem is worse when there is a long distance between the primary storage device and the secondary storage device; because of transmission delays, the time delay required for making the RDF transfer and then waiting for an acknowledgement back after the transfer is complete may be unacceptable.

It is also possible to use RDF in an a semi-synchronous mode, in which case the data is written from the host to the primary storage device which acknowledges the write immediately and then, at the same time, begins the process of transferring the data to the secondary storage device. Thus, for a single transfer of data, this scheme overcomes some of the disadvantages of using RDF in the synchronous mode. However, for data integrity purposes, the asynchronous transfer mode does not allow the primary storage device to transfer data to the secondary storage device until a previous transfer is acknowledged by the secondary storage device. Thus, the bottlenecks associated with using RDF in the synchronous mode are simply delayed by one iteration because transfer of a second amount of data cannot occur until transfer of previous data has been acknowledged by the secondary storage device.

Another possibility is to have the host write data to the primary storage device in asynchronous mode and have the primary storage device copy data to the secondary storage device in the background. The background copy involves cycling through each of the tracks of the primary storage device sequentially and, when it is determined that a particular block has been modified since the last time that block was copied, the block is transferred from the primary storage device to the secondary storage device. Although this mechanism may attenuate the latency problem associated with synchronous and semi-synchronous data transfer modes, a difficulty still exists because there can not be a guarantee of data consistency between the primary and secondary storage devices. If there are problems, such as a failure of the primary system, the secondary system may end up with out-of-order changes that make the data unusable.

Thus, it would be desirable to have an RDF system that exhibits some of the beneficial qualities of each of the different techniques discussed above without the drawbacks. Such a system would exhibit low latency for each host write regardless of the distance between the primary and the secondary and would provide consistency (recoverability) of the secondary in case of failure.

SUMMARY OF THE INVENTION

According to the present invention, transmitting data from a source to a destination, includes receiving the data from the source and providing the data to the destination using a network, where the data is acknowledged to the source as being successfully received at the destination prior to all of the data being provided to the network. The source may be a primary storage device. The destination may be a secondary storage device. The data may be provided from the source in a first format and may be provided to the network in a second format that is different from the first format where the first format may be RDF and the second format may be TCP/IP or UDP. The destination may receive the data in a first format different from a second format used to transmit the data over the network. The first format may be RDF and the second format may be TCP/IP or UDP.

According further to the present invention, a device that transmits data from a source to a destination includes means for receiving the data from the source and means for providing the data to the destination using a network, where the data is acknowledged to the source as being successfully received at the destination prior to all of the data being provided to the network. The source may be a primary storage device. The destination may be a secondary storage device. The data may be provided from the source in a first format and provided to the network in a second format that is different from the first format. The first format may be RDF format and the second format may be TCP/IP or UDP. The device may include means for the destination receiving the data in a first format different from a second format used to transmit the data over the network where the first format may be RDF and the second format may be TCP/IP or UDP.

According further to the present invention, a computer program product that transmits data from a source to a destination includes executable code that receives the data from the source and executable code that provides the data to the destination using a network, wherein the data is acknowledged to the source as being successfully received at the destination prior to all of the data being provided to the network. The source may be a primary storage device. The destination may be a secondary storage device. The data may be provided from the source in a first format and provided to the network in a second format that is different from the first format. The first format may be RDF format and the second format may be TCP/IP or UDP.

In accordance with another aspect of the invention is a method of transferring data from a first storage device to a second storage device. The data is synchronously transferred from the first storage device to a first buffer device. The data is transferred asynchronously from the first buffer device to a second buffer device. The data is transferred synchronously from the second buffer device to the second storage device, wherein the first buffer device acknowledges successful transfer of the data to the first storage device prior to the first buffer device completing the transfer of the data to the second buffer device.

In accordance with yet another aspect of the invention is a device for transferring data from a first storage device to a second storage device. The device includes means for synchronously transferring the data from the first storage device to a first buffer device, means for asynchronously transferring the data from the first buffer device to a second buffer device, and means for synchronously transferring the data from the second buffer device to the second storage device, wherein the first buffer device acknowledges successful transfer of the data to the first storage device prior to the first buffer device completing transfer of the data to the second buffer device.

In accordance with yet another aspect of the invention is a computer program product that transfers data from a first storage device to a second storage device. The computer program product includes executable code that synchronously transfers the data from the first storage device to a first buffer device, executable code that asynchronously transfers the data from the first buffer device to a second buffer device, and executable code that synchronously transfer the data from the second buffer device to the second storage device, wherein the first buffer device acknowledges successful transfer of the data to the first storage device prior to the first buffer device completing transfer of data to the second buffer device.

DETAILED DESCRIPTION OF VARIOUS EMBODIMENTS

Figure 1:
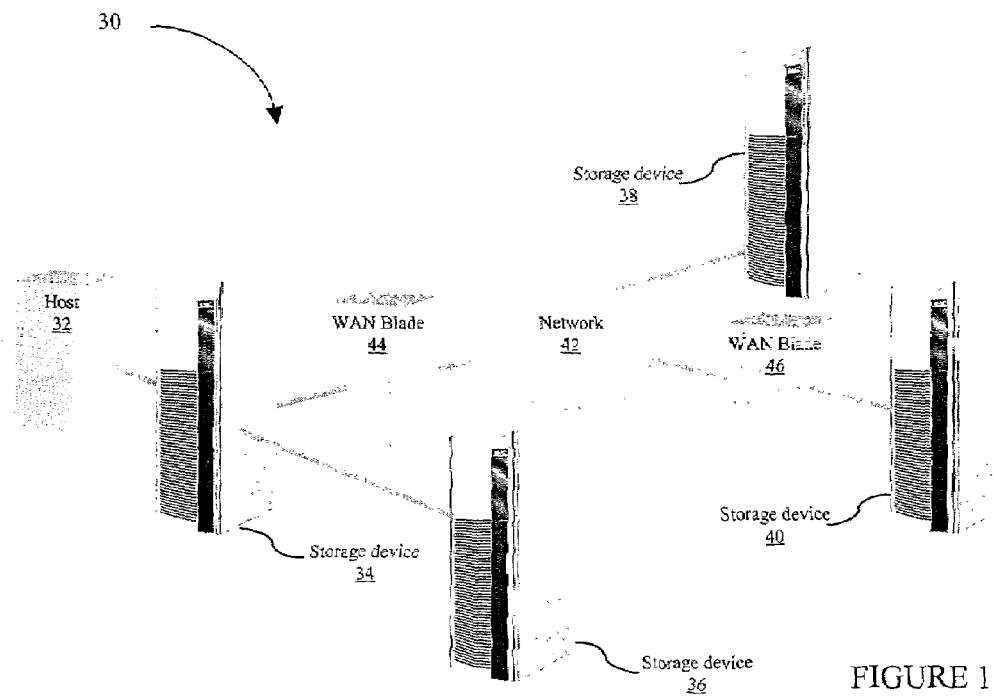
FIG. 1 is a schematic diagram showing a plurality of storage devices, WAN blades, a network and a host.

Referring to FIG. 1, a system 30 includes a host 32 coupled to a first storage device 34. The system 30 also includes a second storage device 36, a third storage device 38 and a fourth storage device 40. The number of storage devices shown for the system 30 is exemplary only and is used to illustrate the system described herein. As may be appreciated by one of ordinary skill in the art, the system 30 may be implemented using any numbers of storage devices interconnected in a variety of manners.

The storage devices 34, 36, 38, 40 may communicate using, for example, the RDF protocol, which is described in U.S. Pat. No. 5,742,792, which is incorporated by reference herein. Some of the storage devices 34, 36, 38, 40 may be interconnected via a network 42. The network 42 may be any type of network such as a network that uses TCP/IP and/or UDP, the Internet, and/or hardwired interconnections. FIG. 1 also shows a first WAN blade 44 and a second WAN blade 46. As discussed in more detail elsewhere herein, the WAN blades 44, 46 may act as buffers for interconnections between the storage devices 34, 36, 38, 40 and, in some instances, may translate data from RDF format to or from another format and/or encrypt and decrypt the data and/or compress and decompress the data. The WAN blades 44, 46 may also simulate synchronous RDF communication or simulate other types of RDF communication, as discussed elsewhere herein. The WAN blades 44, 46 may be implemented as stand alone computers (such as computers containing Celera processors) or may be implement as plug in cards that are internal to a storage device or some other device.

FIG. 1 shows the storage device 34 coupled to the WAN blade 44 which is coupled to the network 42. The interconnection between the storage device 34 and the WAN blade 44 may be a conventional RDF connection. That is, the storage device 34 may be sending and receiving RDF data to and from the WAN blade 44 in a manner substantially similar, or identical, to the way in which the storage device 34 would send and receive RDF data to and from another storage device. Communication between the storage device 34 and the WAN blade 44 may be synchronous RDF, with the storage device 34 acting as the primary storage device for the host 32 and the WAN blade 44 simulating a secondary storage device. In that case, the WAN blade 44 could immediately acknowledge receipt of the data from the storage device 34 and then buffer the data for subsequent transmission over the network 42. In this way, the host 32 may receive a write acknowledgement before the data reaches its ultimate destination (a secondary storage device), thus overcoming some of the timing and throughput difficulties associated with synchronous RDF communication.

The storage device 34 may also be connected to the second storage device 36 via RDF. Thus, the first storage device 34 may be sending and receiving data to and from the WAN blade 44 using a first RDF connection and may be directly sending and receiving data to and from the second storage device 36 using another RDF connection and RDF data.

The WAN blade 44 may receive the RDF data from the first storage device 34 and convert the data to another format, such as UDP or TCP/IP, and then provide the data to the network 42. That is, the WAN blade 44 may receive RDF data from the storage device 34 and encapsulate the data into TCP/IP or UDP packets prior to providing the data to the network 42. Encapsulation may be provided in a conventional manner by, for example, storing the entirety of the RDF data (i.e., including control data) as the payload of a TCP/IP or UDP packet. In addition, the WAN blade 44 may compress and/or encrypt the data without significant performance penalty, since the WAN blade 44 may acknowledge receipt of the data prior to applying the compression and/or encryption (and prior to the data being acknowledged by the secondary storage device).

Note that, in the case of conventional synchronous RDF communication without a WAN blade (or equivalent), encryption, compression, and encapsulation may provide a significant performance penalty since the host does not receive a write acknowledge until the data is received at its ultimate destination (the secondary storage device), and thus encryption/decryption, compression/decompression, and/or encapsulation deencapsulation may increase the delay between the host writing data to the primary storage device and thus delay the host receiving a write acknowledge. With the WAN blade 44, on the other hand, the storage device 34 could receive an acknowledgement prior to the WAN blade 44 encrypting, encapsulation, and/or compressing the data, thus improving throughput.

The third storage device 38 may be connected directly to the network 42. If the network 42 is hardwired and/or in some other way transmits RDF data, then the RDF data may be provided directly from the network 42 to the third storage device 38. Alternatively, if the network 42 is used, for example, to transfer TCP/IP packets, then the network 42 may provide the TCP/IP packets to an internal WAN blade (not shown) of the third storage device 38. The second WAN blade 46 and the fourth storage device 40 may communicate using RDF. Thus, RDF data from the storage device 34 may be provided to the WAN blade 44 using RDF communication. The WAN blade 44 may then encapsulate the data in, for example, a TCP/IP packet and may also optionally encrypt and/or compress the data. The data may then be provided by the WAN blade 44 to the network 42. The data may then be transported over the network 42 until it is received by the WAN blade 46. The WAN blade 46 may then deencapsulate the data (and, as appropriate, decrypt and decompress the data) and provide the data, in an RDF format, to the fourth storage device 40. Note that the RDF connection between the second WAN blade 46 and the fourth storage device 40 may be synchronous RDF, just as with the first WAN blade 44 and the first storage device 34. Thus, the first storage device 34 and the fourth storage device 40 may communicate with each other using RDF format where the WAN blades 44, 46 are interposed there between and used to convert the data to and from a format that can be transmitted via the network 42 (and also optionally used to acknowledge synchronous RDF transmissions).

Data may be transferred from the fourth storage device 40 to the first storage device 34 in a manner similar to data being transferred from the first storage device 34 to the fourth storage device 40, described above. In that case, the fourth storage device 40 may provides RDF data to the WAN blade 46, which would then encapsulate the data in a format suitable for transmission over the network 42 (and possible encrypt and/or compress the data). The WAN blade 44 would then receive the data from the network 42 and would transmit the data in RDF format to the first storage device 34.

The WAN blades 44, 46 may also be used to purposefully delay sending of data. For example, if the storage device 34 is a primary storage device in an RDF group, the WAN blade 44 may be set up to delay sending data for a specific amount of time, such as sixty minutes. Thus, if changes are made to the data on the primary storage device 34 that are deemed unacceptable, it is possible to undo the changes by halting the (delayed) propagation of data to the secondary storage device and then copying the stored data from the secondary storage device back to the primary storage device. Also, in some instances, such as those described elsewhere herein, applications may be restarted on a secondary storage device by coupling a host thereto and converting the primary storage device to a secondary storage device for the host.

It is also possible to provide additional functionality to software on the WAN blades 44, 46 that may not be available in connection with RDF. For instance, the WAN blades 44, 46 could be programmed to recognize data according to files, file systems, host origin, etc. This additional information could then be used to intelligently handle the data, such as by allowing rapid file copying from one WAN blade to another.

Figure 2:
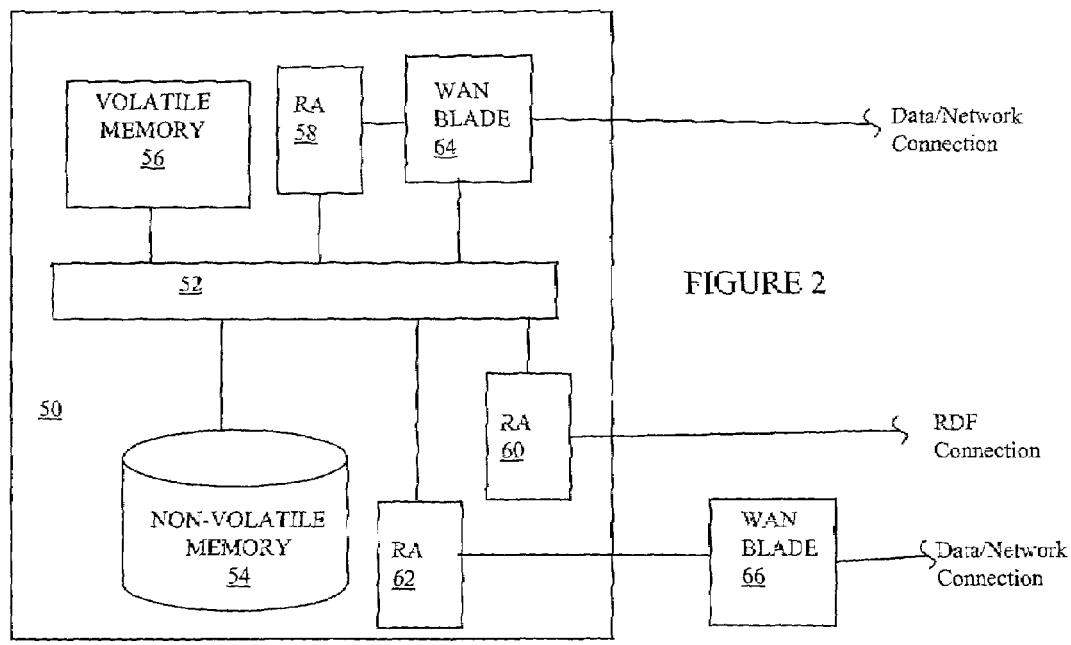
FIG. 2 is a schematic diagram illustrating a storage device that uses internal and external WAN blades.

Referring to FIG. 2, a schematic diagram illustrates a storage device 50 that may provide and receive data in various formats. The storage device 50 may include an internal bus 52 having coupled thereto nonvolatile storage 54, volatile storage 56, and a plurality of RDF adapters (RA's) 58, 60, 62. Other devices that are not shown in FIG. 2 may also be coupled to the bus 52. One of the RA's 58 may be coupled to an internal WAN blade 64 that is internal to the storage device 50 and which may share some of the resources of the internal storage device 50, such as the power supply. The RA 58 may be coupled directly to the WAN blade 54 via, for example, an Ethernet connection or other type of appropriate connection. Alternatively, or in addition to coupling the WAN blade 54 directly to the RA 58, the RA 58 may communicate with the WAN blade 64 using the bus 52.

The RA 60 may provide a conventional RDF connection to another storage device. The RA 62 may be coupled to an external WAN blade 66 that sends and receives RDF data in an RDF format to and from the RA 62 while providing data in another format, or possibly the same format, using a data connection to, for example, a network. Note that the connections to the storage device 50 may be Fibre Channel, ESCON, or any other type of connection capable of supporting the functionality disclosed herein.

Figure 3:
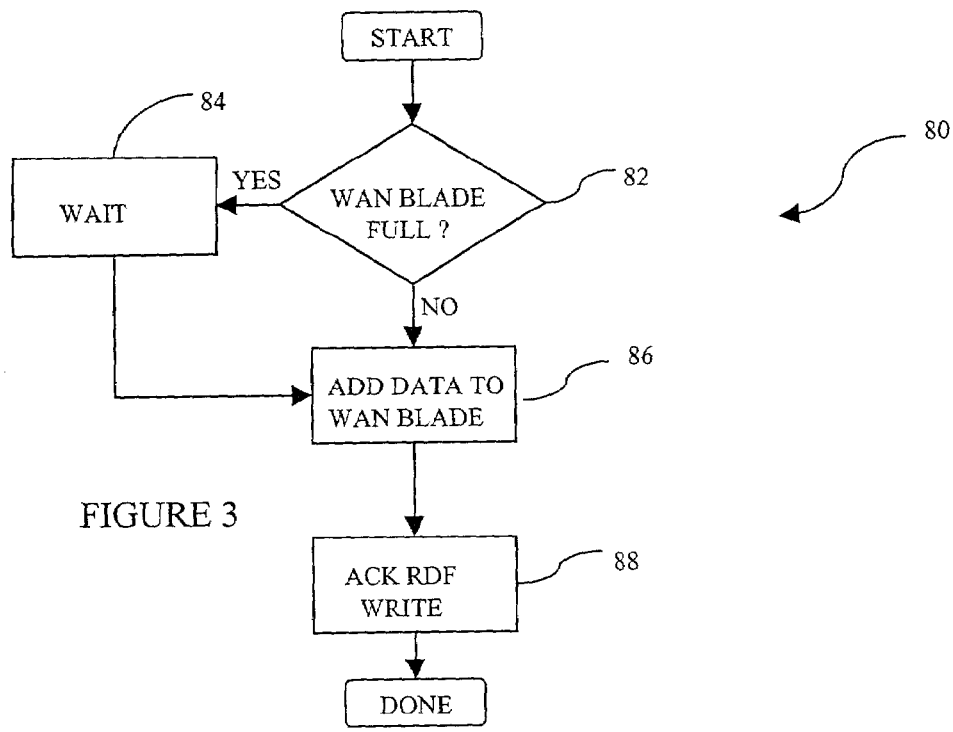
FIG. 3 is a flowchart illustrating steps for transferring data from a storage device to a WAN blade.

Referring to FIG. 3, a flowchart 80 illustrates steps for transferring data from a storage device to a WAN blade. Processing begins with a first test step 82 where it is determined if internal storage in the WAN blade is full (i.e., if the WAN blade has room to store the data). That is, it is determined at the test step 82 if the WAN blade to which the data is being transferred has room to store additional data. If it is determined at the test step 82 that the WAN blade is full, then control passes from the step 82 to a step 84 where the storage device is made to wait for room in the WAN blade. While the storage device is waiting for room, the WAN blade can simply reply to the request by the storage device to transfer data in a conventional RDF format indicating that the device to which the transfer is being made is not ready. In other embodiments, the WAN blade being full triggers error processing, discussed elsewhere herein.

Following step 84, or following the test step 82 if it is determined that the WAN blade is not full, is a step 86 where the data is transferred to the WAN blade (the WAN blade sends appropriate RDF commands to accept the data). Following the step 86 is a step 88 where the WAN blade acknowledges the RDF write. Following the step 88, processing is complete.

Note that once data has been transferred to the WAN blade, it may be modified in a manner that is appropriate for the WAN blade to send the data. For example, the WAN blade may encapsulate the data in TCP/IP or UDP format. The WAN blade may also encrypt and/or compress the data.

Figure 4:
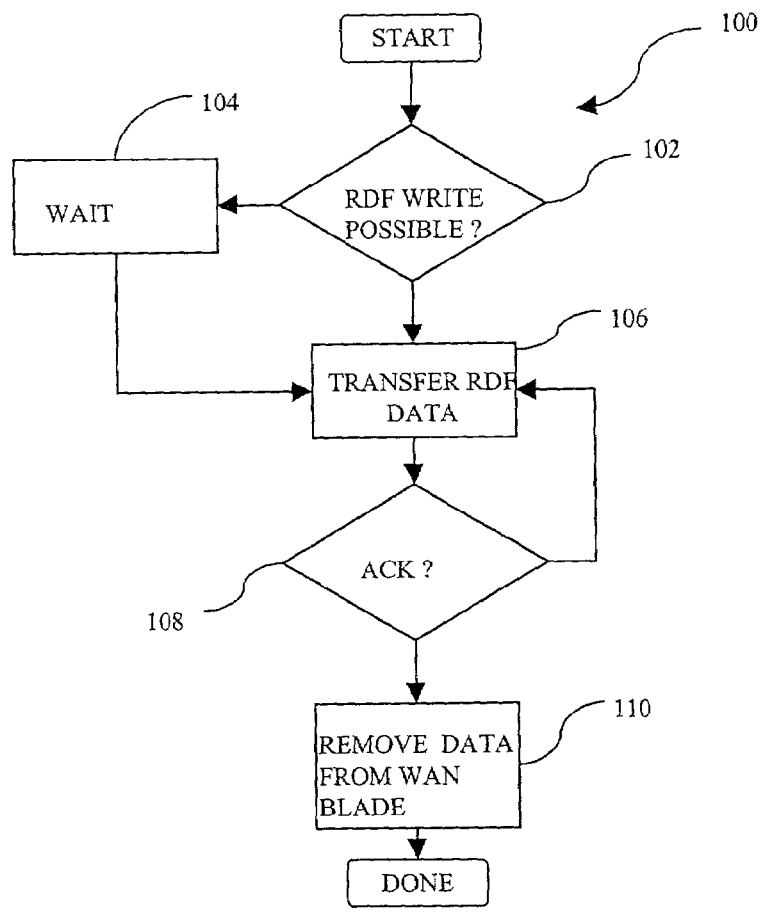
FIG. 4 is a flowchart illustrating steps performed in connection with transferring data from a WAN blade to a storage device.

Referring to FIG. 4, a flowchart 100 illustrates steps performed in connection with a WAN blade transferring data to a storage device. Processing begins in a first test step 102 where it is determined if an RDF write is possible. That is, the WAN blade determines if the storage device that is receiving the data is ready to accept an RDF write of the data. If not, then control transfers from the step 102 to a step 104 where the WAN blade waits for the storage device to be ready for the RDF write.

Following the step 104, or following the step 102 if the storage device is initially ready for an RDF write, is a step 106 where the RDF data is sent from the WAN blade to the storage device. As discussed elsewhere herein, the WAN blade sending the data to the storage device may appear to the storage device as a conventional RDF write. Following the step 106 is a test step 108 where it is determined if the storage device has acknowledged the write of the data from the WAN blade. If not, control transfers from the step 108 back to the step 106 where the WAN blade resends the data. The step 106 is followed by the test step 108 where it is determined if receipt is acknowledged. The steps 106, 108 represent the WAN blade sending and resending the data until the data is acknowledged by the storage device. Note that it is possible to introduce more sophisticated processing where, for example, after a certain number of tries, such as three, an error is posted and the write operation is aborted. This is not shown explicitly in FIG. 4, but is understood by one of ordinary skill in the art that this may be implemented by providing additional steps in connection with the steps 106, 108. Once it is determined at the step 108 that the storage device acknowledges the write operation, control passes to a step 110 where the data that has been written from the WAN blade to the storage device is removed from the WAN blade. Following the step 110, processing is complete.

Note that, prior to the data being sent from the WAN blade to the storage device, the data may require preprocessing, which is not shown explicitly in FIG. 4. For example, if the data is provided to the WAN blade as a TCP/IP or UDP packet, the WAN blade may deencapsulate the data prior to sending the data to the storage device. Similarly, the WAN blade may need to decompress and/or decrypt the data.

Although FIGS. 3 and 4 illustrate transferring data between the WAN blades and storage devices, it is understood by one of skill in the art that the disclosed technique may be applied to transferring data between the WAN blades and a network and/or any other connection between the WAN blades, including a direct connection therebetween. Transferring data to and from the WAN blades may be facilitated by using a journal to store data that is transmitted by a WAN blade and to store data that is received by a WAN blade. A journal may be volatile or non-volatile memory. A journal may be part of a corresponding WAN blade, part of a corresponding storage device, or may be separate from both the corresponding storage device and the corresponding WAN blade. Use and implementation of journals is discussed in more detail elsewhere herein.

Figure 5:
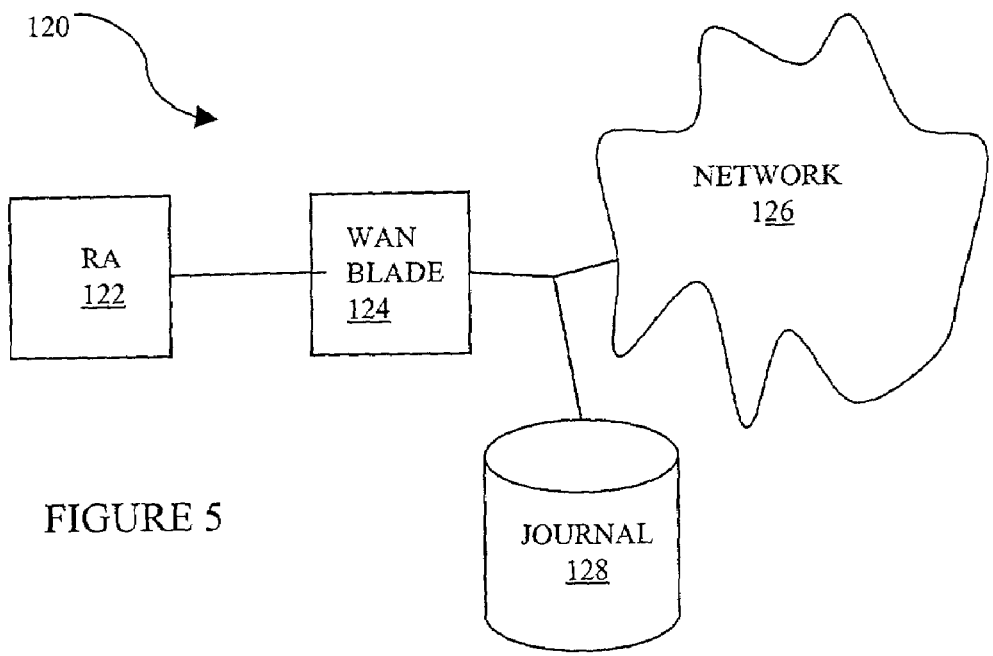
FIG. 5 is a schematic diagram illustrating a relationship between a WAN blade, a network and a journal.

Referring to FIG. 5, a schematic diagram 120 illustrates an RA 122 coupled to a WAN blade 124 that is coupled to a network 126. A journal 128 is shown as being coupled to the connection between the WAN blade 124 and the network 126. The journal 128 is used for transferring data and for recovery, as discussed in more detail hereinafter.

Figure 6:
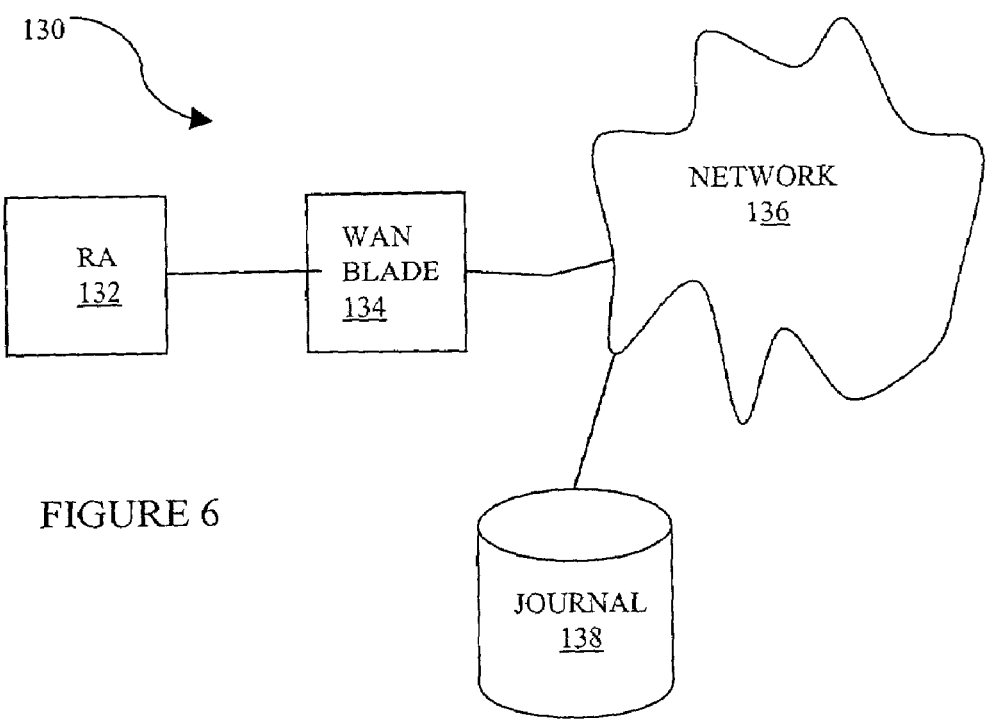
FIG. 6 is a schematic diagram illustrating a different relationship between a WAN blade, a network and a journal.

Referring to FIG. 6, a schematic diagram 130 illustrates an alternative journaling configuration is illustrated where an RA 132 is coupled to a WAN blade 134 which is coupled to a network 136. In the example of FIG. 6, a journal 138 is coupled to the network 136 rather than being coupled to the connection between the WAN blade 134 and the network 136.

Figure 7:
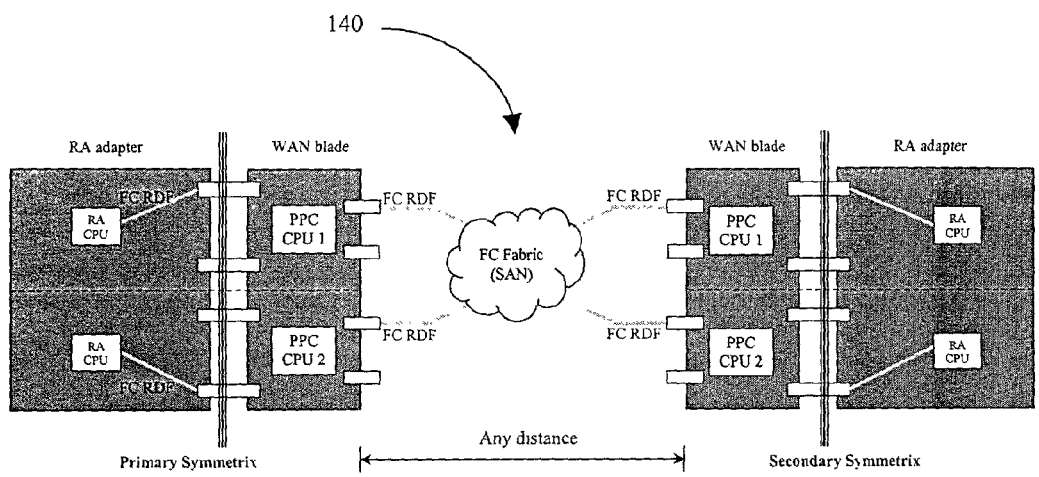
FIG. 7 is a schematic diagram showing a configuration for interconnecting WAN blades and storage devices over a network.

Referring to FIG. 7, a diagram 140 illustrates connections between RA adapters of a primary storage device (Primary Symmetrix), WAN blades, and RA adapters of a secondary storage device (Secondary Symmetrix). The SAN represents a storage area network for providing a data coupling between the primary and secondary storage devices. As described in more detail below, the diagram 140 illustrates one of many possible configurations that may be used to facilitate ordering the transfer of data between the primary storage device and the secondary storage device.

In conventional synchronous RDF, data is provided from the primary storage device to the secondary storage device in the same order that that data is provided by the host to the primary storage device. Thus, it would be desirable to provide the data to a secondary storage device from a WAN blade coupled to the secondary device in the same order that the data was provided by a primary storage device to a WAN blade coupled to the primary storage device. In that way, the secondary storage device could receive the data in the same order that it was provided by the primary storage device. In addition, with appropriate use of journaling, as described hereinafter, recovery is facilitated if the data is provided to the secondary storage device in the order it was sent by the primary storage device.

In addition, in many instances, writes from a host to the primary storage device are dependent upon each other. For example, a host application copying data to a file may write a first block, wait for an acknowledgement for that write, then write a second block, etc. The host application does not write the second block unless and until the storage device acknowledges successful write of the first block. Thus, in a system that acknowledges write operations by the host prior to the data actually being successfully stored at the ultimate destination of the data (i.e., the secondary storage device) it is useful to be able to provide the data to the secondary storage device in the order that the data was written to the primary storage device by the host.

Figure 8:
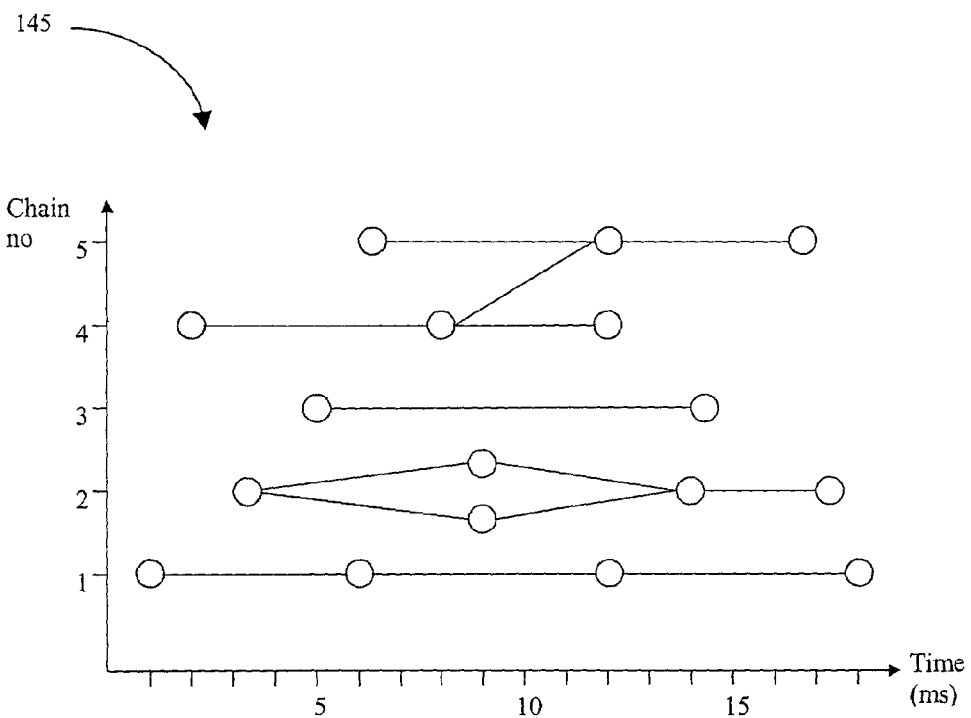
FIG. 8 is a schematic diagram illustrating dependent writes from a host to a storage device.

Referring to FIG. 8, a diagram 145 illustrates dependent writes for a plurality of "chains" of dependency. The vertical axis represents different chains of dependency. A first chain of dependency may be independent from a second chain of dependency because, for example, the chains correspond to different applications. Each write is represented by a circle. The horizontal axis represents time. The links between the circles represent dependency, going from left to right. Thus, for example, for chain number one in the diagram 145, the write at six ms is dependent upon the write at one ms being successfully completed first. Note, interestingly, that for two independent chains, the relative ordering of the writes may not be critical. Thus, for example, if the first write for each of the five chains shown in the diagram 145 may be provided to the secondary storage device(s) in a somewhat different order than that shown in the diagram 145.

Figure 9:
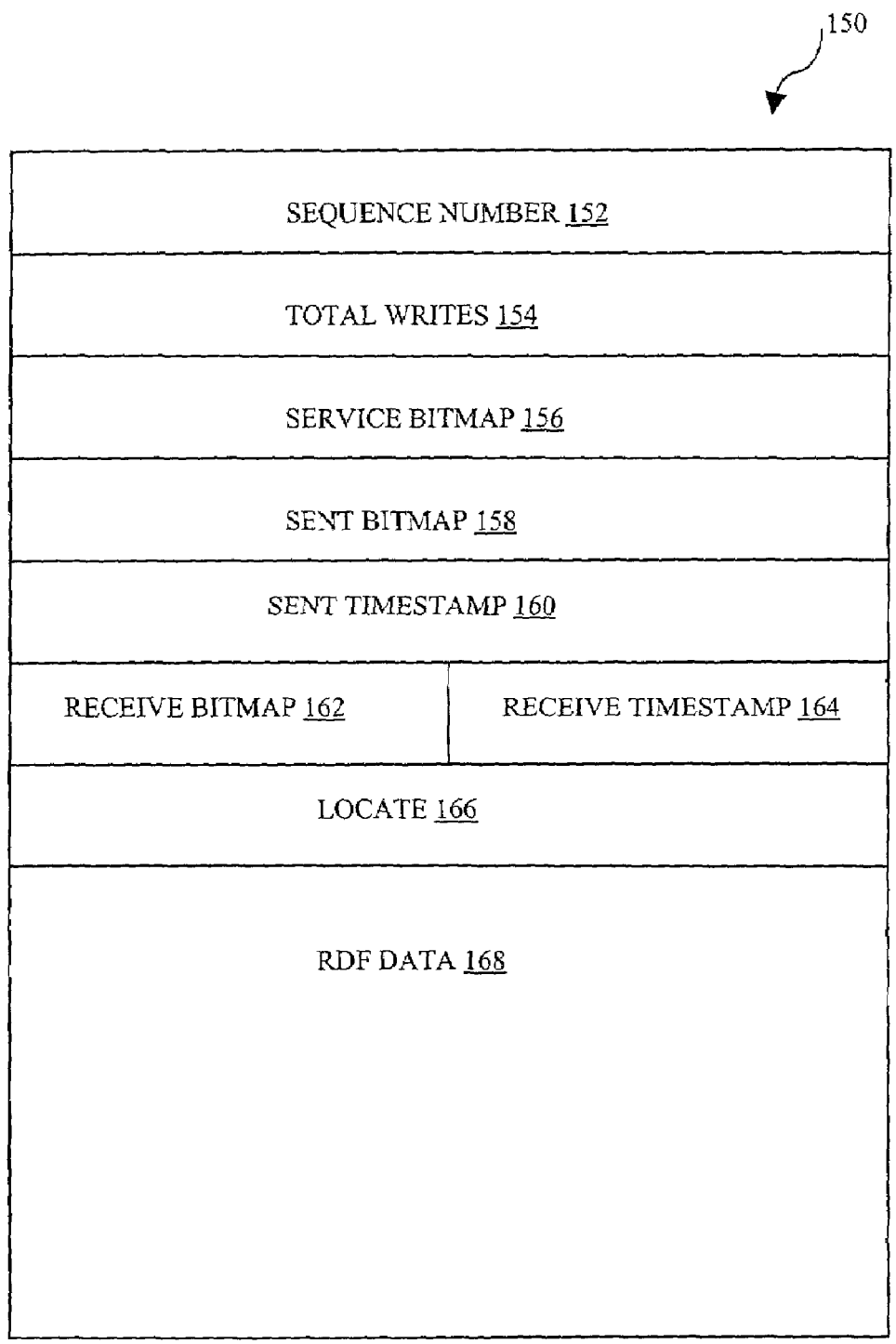
FIG. 9 is a schematic diagram illustrating a data structure used to send and receive data to and from WAN blades.

Referring to FIG. 9, a data structure 150 may be used to communicate data between primary WAN blades and secondary WAN blades. The data structure 150 includes a sequence number field 152 which is used to store a sequence number associated with each block of data corresponding to the data structure 150. The sequence number field 152 is used to sequentially order the data writes. As described in more detail below, the sequence number is periodically incremented so that the sequence number indicates the order of writes. Use of the sequence number field 152 is described in more detail below. The data structure 150 also includes a total writes field 154, a service bit map field 156, a sent bit map field 158, and a sent time stamp 160. The fields 154, 156, 158 and 160 are also described in more detail below.

The data structure 150 also includes a received bit map field 162 and a received time stamp field 164. In the embodiment disclosed herein, the received bit map field 162 is used by WAN blades in connection with data that is being sent and the received time stamp field 164 is used by WAN blades in connection with receiving data. Thus, the field 162 and the field 164 may overlap and may use the same location of the data structure 150 since the received bit map 162 is used by the WAN blades sending data and the received time stamp field 164 is used by the WAN blades receiving data.

The data structure 150 may also include a locate data field 166 and an RDF data field 168. The data fields 166, 168 correspond to RDF data that is sent in conventional fashion. Thus, the data structure 150 may be used to encapsulate information in the fields 166, 168 that is conventionally provided in connection with RDF communication. Note that the data structure 150 may be further encapsulated in another format, as appropriate, for whatever communication is being used between the WAN blades, such as transportation over networks. For example, if WAN blades are communicating using a TCP/IP network, than data stored in the data structure 150 may be encapsulated in a TCP/IP packet that may be constructed by the WAN blade sending the data and transported over the network where it is received by a receiving WAN blade that de-encapsulates the data to provide the data structure 150.

The total writes field 154 indicates the total number of writes corresponding to each of the sequence numbers. Thus, for example, there may have been five instances of the data structure 150 written with the sequence number having a value of N. In that case, the data provided in the total writes field 154 would be five, indicating that there are five separate instances of data having sequence number N stored in the sequence number field 152.

The service bit map field 156 indicates the destinations of the data 150. It is possible for a WAN blade coupled to a primary storage device to need to write to multiple WAN blades coupled to secondary storage devices, especially in connection with servicing a consistency group having multiple storage devices and multiple WAN blades. The service bit map field 156 indicates which WAN blades are to receive the data 150. The service bit map field 156 may be implemented by having a bit position in the service bit map field 156 correspond to a particular one of the secondary WAN blades. Thus, for example, if there are eight (8) possible WAN blades that could be serviced, then bit position zero in the service bit map field 156 could indicate a first WAN blade, bit position one in the service bit map field 156 could indicate a second WAN blade, etc.

The sent bit map field 158 is used by a WAN blade coupled to a primary storage device and indicates which of the secondary WAN blades coupled to secondary storage devices have been sent the data 150. Note that when the value in the sent bit map field 158 equals the value in the service bit map field 156, then the data 150 has been sent by the WAN blade coupled to primary storage devices to all of the WAN blades coupled to secondary storage devices that receive data from the primary storage device.

The sent time stamp field 160 indicates the time that the data 150 has been sent. The sent time stamp field 160 may be used to implement a time out where, after a predetermined amount of time, the data 150 is deemed sufficiently old to be deleted from the WAN blade storage (journal), as described in more detail below. Other techniques for determining when to delete data from WAN blade storage are also discussed below.

The receive bit map field 162 may be used by WAN blade coupled to a primary storage device as an indication of which of the WAN blades coupled to secondary storage devices have acknowledged receipt of the data 150. Note that when the received bit map field 162 equals the service bit map 156, then all of the WAN blades coupled to secondary storage devices have received the data. The received bit map field 162 may also be set according to receipt of signals indicating that data has been successfully transferred to the secondary storage devices.

The received time stamp 164 is used by WAN blades coupled to secondary storage devices and is helpful to provide a time out mechanism. A WAN blade coupled to a secondary storage device may want to time out after a predetermined amount of time has passed from when the data was received (as indicated by the received time stamp field 164) and when the data is acted upon.

The data 150 may be stored internally to the WAN blade or, if the WAN blade is part of the storage device, may be stored internally to the storage device. Alternatively, the data 150 may be stored as journal data, as set forth, for example, in connection with the journal data 128 of FIG. 5 and/or the journal data 138 of FIG. 6. The journal data may be internal or external to the WAN blade and may or may not be stored on a storage device associated with the WAN blade.

Figure 10:
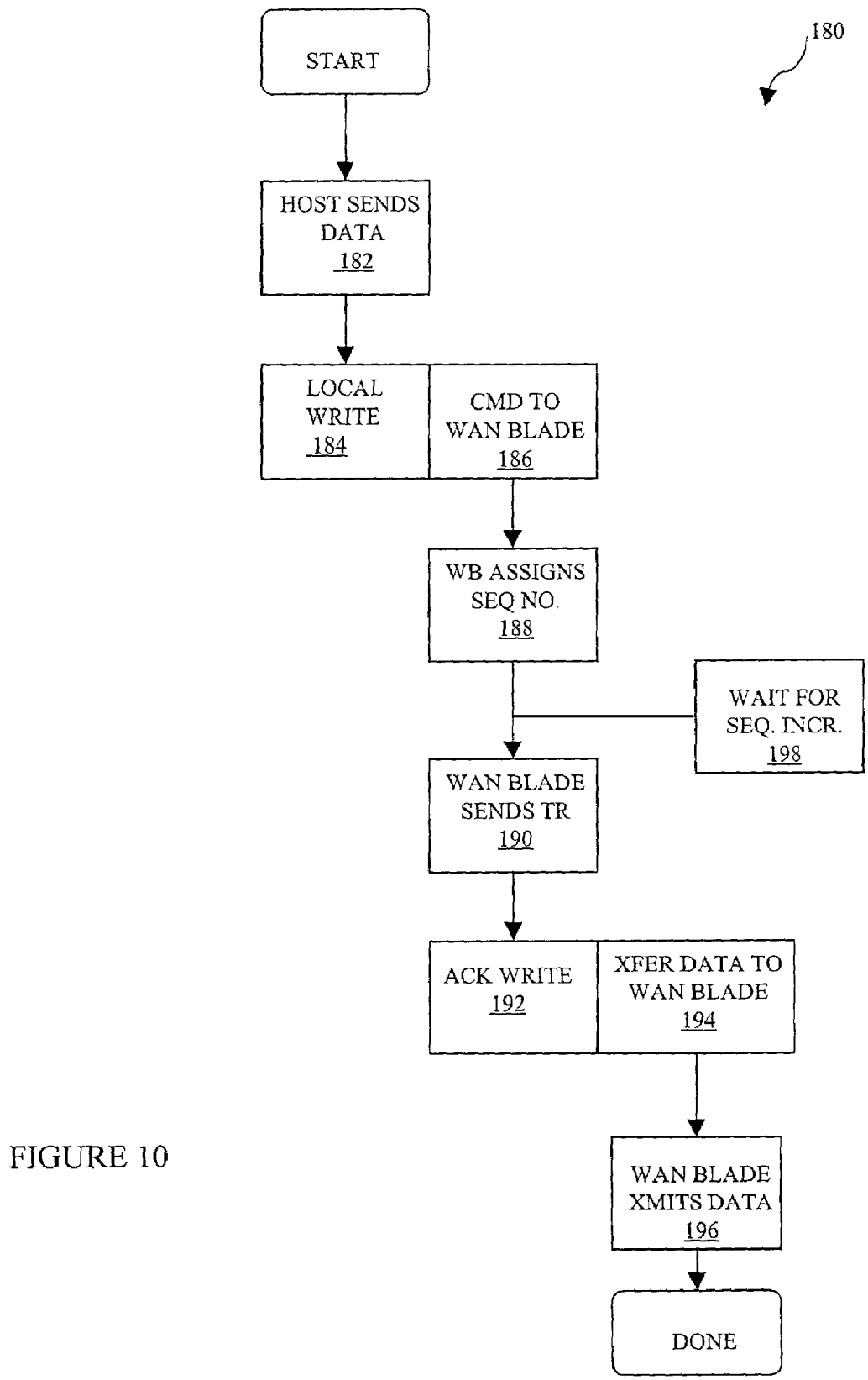
FIG. 10 is a flowchart illustrating steps performed in connection with transferring data to a WAN blade coupled to a primary storage device.

Referring to FIG. 10, a flow chart 180, illustrates steps performed in connection with a primary storage device providing data to a primary WAN blade coupled thereto. Processing begins at a first step 182 where a host provides data to the local storage device (the primary storage device). Following the step 182 are two steps 184, 186, which are shown in the flow chart 180 as being able to be performed in parallel. At the step 184, the storage device performs a local write operation to non-volatile memory of the local storage device. In parallel, the storage device may also send a write command to a WAN blade coupled thereto. Following the step 186 is a step 188 where the WAN blade assigns a sequenced number to the data (even though the data has not yet been transferred). Following step 188 is a step 190 where the WAN blade indicates a transfer ready signal back to the local storage device. Following the step 190 are two steps 192, 194 that are shown as being able to be performed in parallel. At the step 192, the storage device acknowledges the write operation to the host. Note that the step 192 may be performed before the storage device has had an opportunity to actually transfer the data to the WAN blade. That is, the storage device may acknowledge the write operation to the host as soon as the WAN blade provides a transfer ready but before the data has actually been transferred from the storage device to the WAN blade. Implementing this functionality may require slight modifications to conventional RDF software operating on the primary storage device.

In parallel with the step 192 is the step 194 where the storage device begins transferring data to the WAN blade. As discussed above, this transfer may take place simultaneously (and/or before or after) with the storage device acknowledging the write to the host. Following the step 194 is a step 196 where the WAN blade transfers to the data to a WAN blade coupled to one or more secondary storage devices This transfer may use, for example, a network. Following the step 196, processing is complete.

The flow chart 180 also shows a step 198 that may be interposed between the steps 188, 190. The step 198 indicates waiting for the sequence number to increment. After the WAN blade assigns a sequence number at the step 188, the WAN blade may wait for the next sequence number (i.e. for the sequence number to increment) before the WAN blade indicates a transfer ready for the data associated with the previous sequence number. The step 198 provides a mechanism to ensure that all of the data associated with a particular sequence number is transferred to the WAN blade before the host receives an acknowledgment that the data has been properly written. Waiting for the next sequence number at the step 198 is discussed in more detail below.

Figure 11:
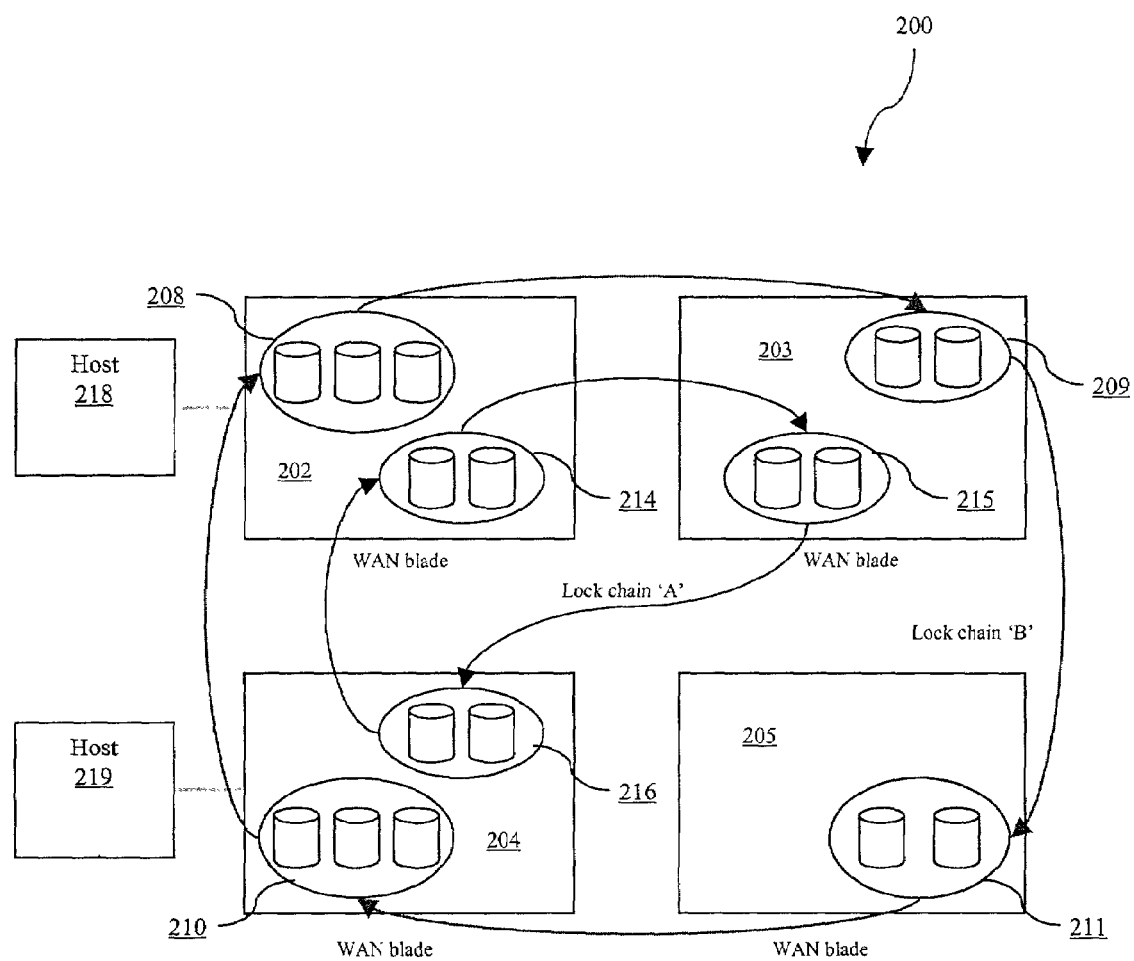
FIG. 11 is a schematic diagram illustrating a consistency group.

Referring to FIG. 11, a system 200 is illustrated as including a plurality of storage devices 202-205 having a first set of WAN blades 208-211 and a second set of WAN blades 214-216. In the diagram of FIG. 11, the WAN blades 208-211, 214-216 are shown as being internal to the storage devices 202-205. However, it may be appreciated by one of ordinary skill in the art that the system 200 may operate with WAN blades being provided external to the storage devices 202-205, WAN blades being provided internal to the storage devices 202-205, or any combination thereof.

The WAN blades 208-211 and the storage devices 202-205 are shown as forming a first consistency group while the WAN blades 214-216 and the storage devices 202-204 are shown as performing a second consistency group. Consistency groups are used to provide a mechanism where data on multiple storage devices may be copied from one of the storage devices that is coupled to the host. That is, in the example of FIG. 11, it is possible for the storage device 202 to be the primary storage device for the consistency group that includes the storage devices 202-205 where a first host 218 is coupled to the storage device 202 that is the primary storage device for the consistency group. For the consistency group corresponding to the WAN blades 214-216, the storage device 204 may be the primary storage device with the storage devices 202, 203 being secondary storage devices, where a second host 219 is coupled to the storage device 204 that is the primary storage device for the consistency group. The two consistency groups shown in FIG. 11 may operate independently. Thus, the storage device 202 may be the primary storage device for one consistency group and a secondary storage device for another consistency group. Similarly, the storage device 204 may be the primary storage device for one consistency group and a secondary storage device for another consistency group.

It is useful for data that is provide by the WAN blade corresponding to the primary storage device to be received by the secondary storage devices in the order that it was provided to the WAN blade coupled to the primary storage device. Thus, for example, if a primary storage device writes data in a sequence corresponding to A, B, C, it is useful if the secondary storage device receives the data in that same order, A, B, C, and not in some other order such as B, A, C. Having the secondary storage device receive the data in the order it was provided by the primary storage device facilitates data recovery, as described in more detail below. Use of the sequence number facilitates writing the data in the correct order.

Figure 12:
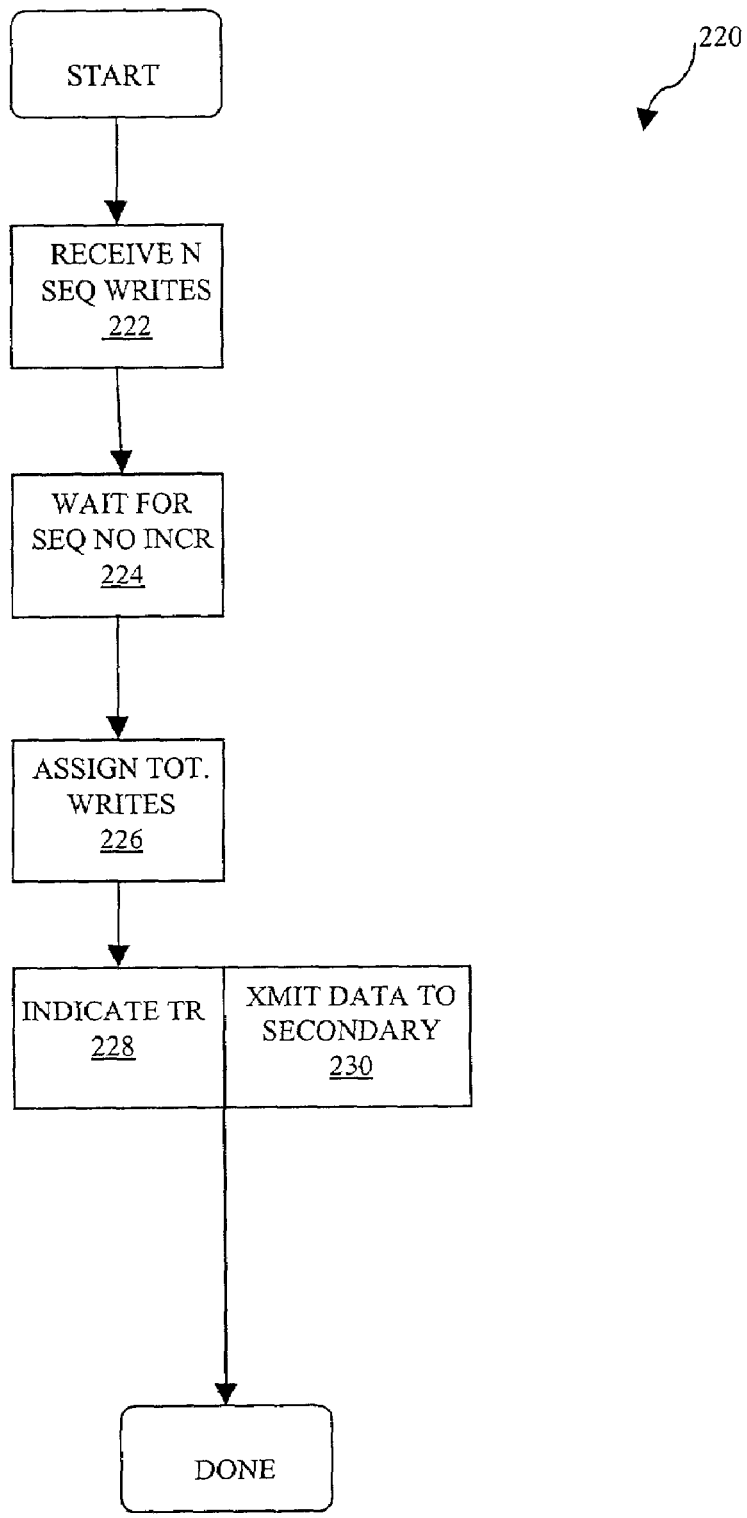
FIG. 12 is a flowchart illustrating steps performed in connection with transferring data from a primary storage device to a WAN blade using a shuttle for sequencing.

Referring to FIG. 12, a flow chart 220, illustrates steps performed in connection with providing data from a primary storage device to a WAN blade coupled thereto in a way that facilitates a corresponding secondary storage device receiving the data in the same order that the data was provided by the primary storage device. Processing begins at a first step 222 where the WAN blade receives the data from the primary storage device and associates the data with a sequence number N. Following the step 222 is a step 224 where the primary storage device waits for the sequence number to increment. A mechanism for changing the sequence number is described in more detail hereinafter.

Following step 224 is a step 226 where, once the sequence number is incremented, the total writes field of all of the data elements associated with the sequence number N (the previous sequence number) is filled in. It is possible to provide the total writes field at the step 226 because, since the sequence number is incremented to N+1, the WAN blade would not expect to receive any more data that would be associated with the sequence number N. Following the step 226 are two steps to 228, 230 that may be performed in parallel. The step 228 corresponds to the WAN blade indicating a transfer ready to the primary storage device. As discussed above, once the WAN blade has indicated a transfer ready to the primary storage device, the primary storage device may acknowledge the write to the host, even though the data has not yet been provided to (or acknowledged by) a secondary storage device. The step 230 corresponds to the WAN blade sending the data to the WAN blade associated with the secondary storage device.

Although there may be many possible techniques for incrementing the sequence number, an embodiment disclosed herein uses a "shuttle" algorithm to increment the sequence number in connection with the ordered writes between the one or more WAN blades associated with the primary storage device and the one or more WAN blades associated with the secondary storage device. A shuttle is a small program that is passed from device to device over the communication links in a round-robin fashion. In the embodiment discussed herein, there is one shuttle that circulates among the WAN blades associated with the primary storage devices of each consistency group and another, separate, shuttle that circulates among the WAN blades associated with the secondary storage devices of each consistency group. Each consistency group has its own set of shuttles. The shuttles carry the sequence number that is used in connection with the ordered writes.

Figure 13:
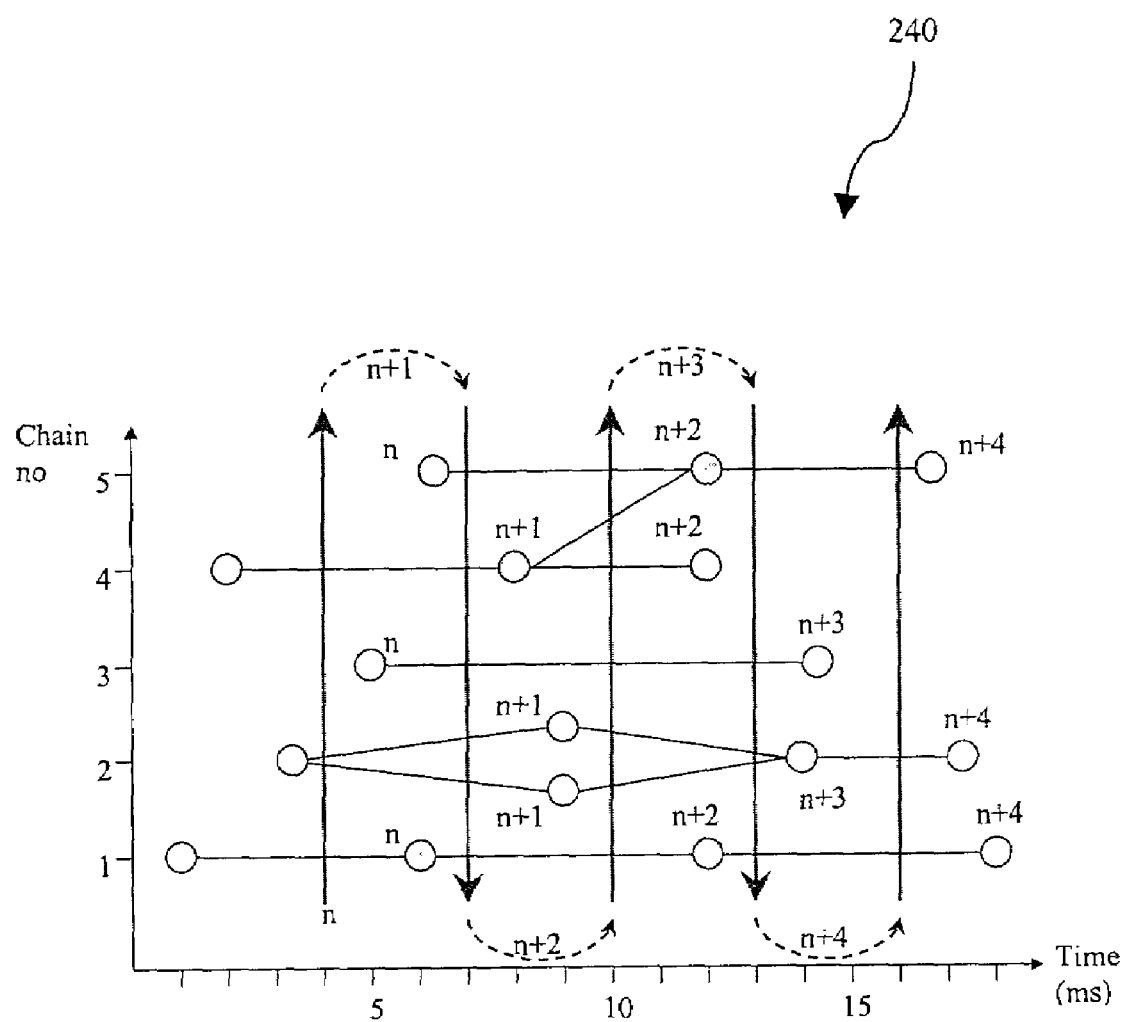
FIG. 13 is a diagram illustrating use of a shuttle in connection with dependent writes from a host to a storage device.

Referring to FIG. 13, a diagram 240 illustrates a relationship between the shuttle and the various chains of dependency set forth in the diagram 145 of FIG. 8. The vertical arrows represent traversal of the shuttle. The labels n, n+1, etc. represent using the shuttle to increment the sequence number. Thus, for example, all of the writes to the left of the first arrow on the left may be assigned sequence number n, all of the writes between the far left arrow and the arrow next to the far left arrow may be assigned sequence number n+1, etc. As shown by the diagram, two writes are assigned different sequence numbers if one of the writes depends from the other one of the writes. In this way, newer data is not written to the secondary storage device prior to writing the data from which the newer data depends.

Figure 14:
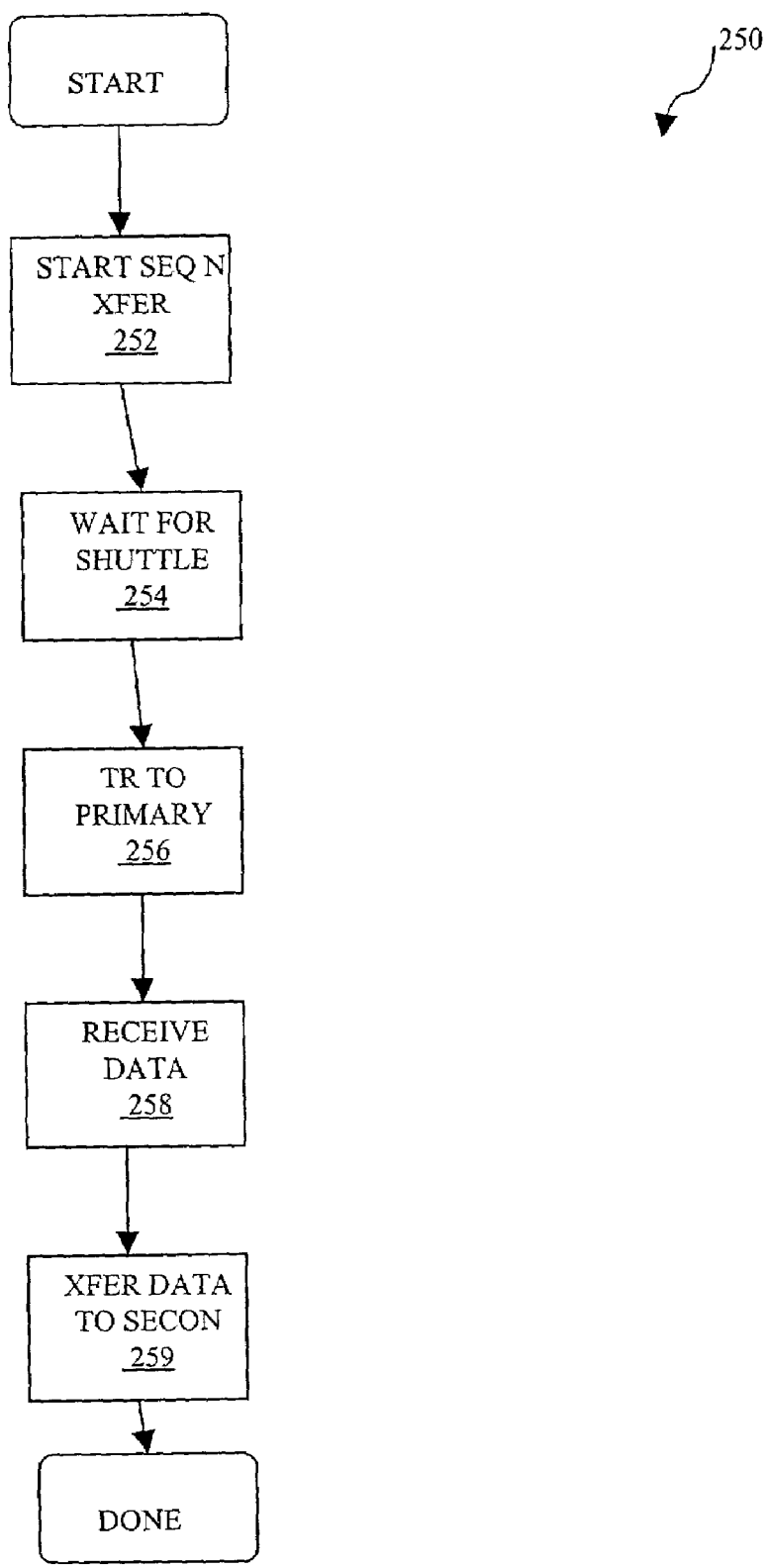
FIG. 14 is a flowchart illustrating steps performed in connection with using a shuttle for sequencing in connection with transferring data from a primary storage device to a WAN blade.

Referring to FIG. 14, a flowchart 250 illustrates steps performed in connection with a WAN blade coupled to a primary storage device receiving data from the storage device and using the shuttle and sequence number to handle the data. Processing begins at a first step 252 where the data is received by the WAN blade from the primary storage device. At the step 252, it is assumed that the common sequence number is N, which is assigned to the data.

Following step 252 is step 254 where the primary WAN blade waits for the shuttle to come around indicating a new sequence number, N+1. Waiting for the new sequence number at the step 254 insures that the WAN blade associated with primary storage device has received all of the data that will be associated with sequence number N.

Following step 254, is step 256 where the WAN blade indicates transfer ready to the primary storage device for all of the data associated with sequence number N. As discussed elsewhere herein, the primary storage device receiving a transfer ready from the WAN blade causes the primary storage device to acknowledge the write to the host, even though the data has yet to be transferred from the primary storage device to the WAN blade (or, for that matter, to a secondary storage device). Sending acknowledgment to the host based on receipt of the transfer ready signal may significantly increase through put over conventional synchronous RDF. Following step 256 is step 258 where the data is received by the WAN blade from the primary storage device. Following step 258 is step 259 where the data is sent from the WAN blade to one or more WAN blades coupled to secondary storage devices. Following step 259, processing is complete.

In other embodiments, it is possible to increment the sequence number periodically, rather than using a shuttle to rotate among the primary WAN blades coupled to primary storage devices of a consistency group. The time interval between increments may be set according to the amount of time it would take the host to write two successive pieces of data from the same source. That is, if a second write depends on a first write being acknowledged to the host (i.e., a dependent write), there is a minimum amount of time to be expected between the two dependent rights. The time interval for incrementing the sequence number may be set according to the minimum time expected between two dependent writes.

Figure 15:
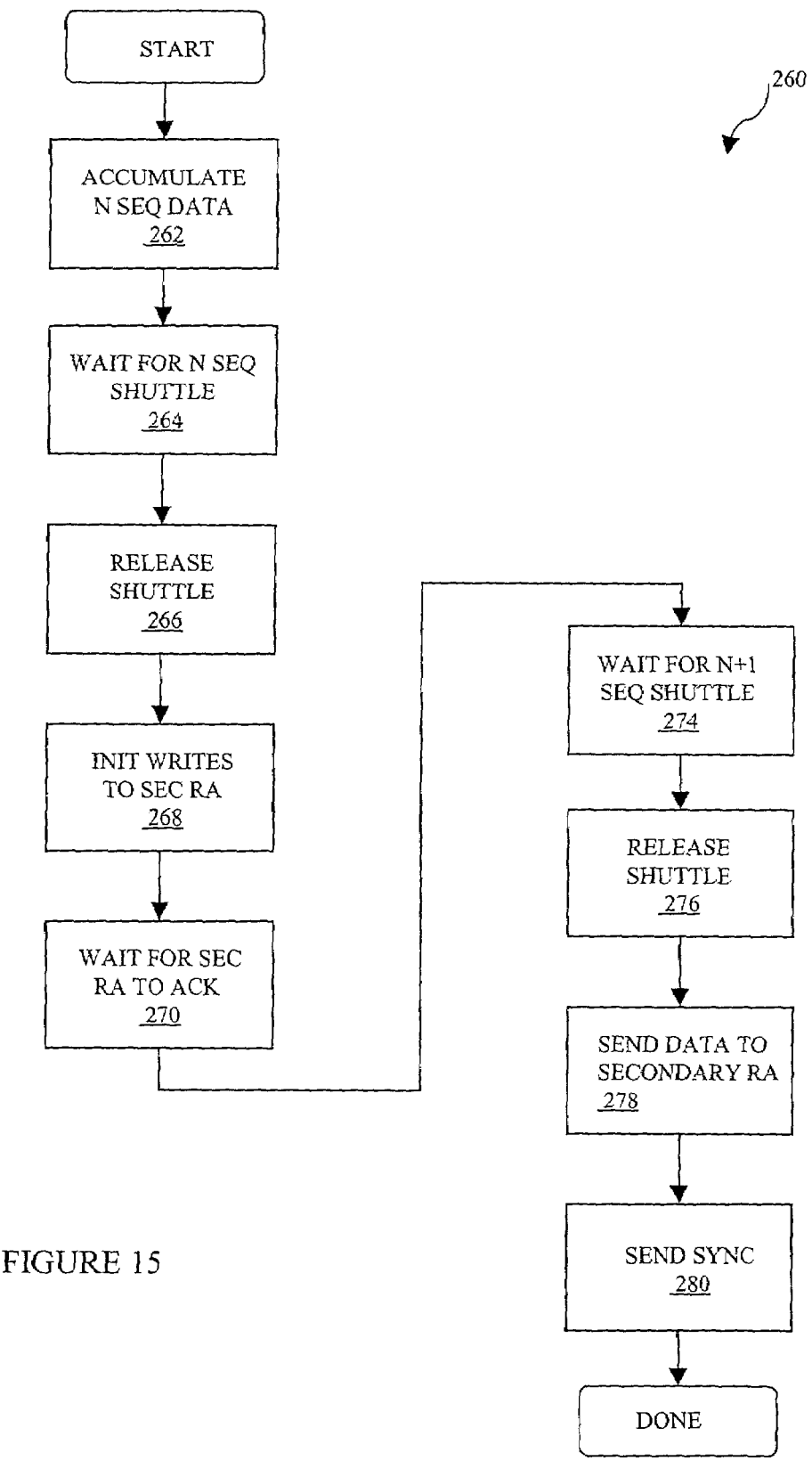
FIG. 15 is a flowchart illustrating steps performed in connection with transferring data from a WAN blade to a secondary storage device using a shuttle for sequencing.

Referring to FIG. 15, a flowchart 260 illustrates steps performed by a WAN blade coupled to a secondary storage device and using the shuttle to handle the transfer of data. Processing begins at the first step, 262, where the WAN blade accumulates (e.g., in the journal) data having sequence number N. Following the step 262 is a step 264 where the WAN blade waits for the shuttle having sequence number N to come around. Following step 264 is step 266 where the WAN blade releases the shuttle.

Following step 266 is step 268 where the WAN blade initiates writes to the secondary storage device for all of the data associated with sequence number N. Following step 268 is step 270 where the WAN blade waits for the secondary storage device to acknowledge the initiation of all the writes. Following step 270 is step 274 where the WAN blade waits for the shuttle having sequence number N+1. Following step 274 is step 276 where the WAN blade releases the shuttle. Following step 276 is step 278 where the WAN blade transfers the data associated with sequence number N from the WAN blade to the secondary storage device.

Following the step 278 is a step 280 where the WAN blade coupled to the secondary storage device sends a sync signal back to the WAN blade coupled to the primary storage device (the WAN blade that sent the data). Receipt of the sync signal by the WAN blade that sent the data indicates that the data has been successfully transferred to the secondary storage device. In some embodiments, it is the receipt of the sync signal from each of the WAN blades coupled to the various secondary storage devices that is used by the WAN blade coupled to the primary storage device to set the appropriate bit of the receive bitmap field 162 of the data structure 150. In some embodiments, when the receive bitmap field 162 equals the service bitmap field 156 (indicating that the data has been successfully stored on all of the secondary storage devices of a consistency group), the WAN blade coupled to the primary storage device deletes the journal entries corresponding to the data. Following the step 180, processing is complete.

Note that there are many types of failures that could prevent an RDF consistency group from synchronizing data. When this occurs, the consistency group "triggers", meaning that the secondary storage device(s) are deemed not ready by the primary storage device and any subsequent updates on the primary storage device are marked as invalid on the secondary storage device(s). When the failure is subsequently addressed, data that was marked as invalid during the failure may be copied from the primary storage device to the secondary storage device(s) in connection with normal operation being restored.

Adding the WAN blades and network connections to an RDF consistency group may increase the complexity of handling failures while, at the same time, providing additional options for error recovery. A link failure occurs when any of the communication links fails. A link failure may be detected by failure to receive the shuttle and/or failure of a linked device to respond to a direct inquiry. Note that failure of a link between a WAN blade and its corresponding RA may be unrecoverable, and thus could trigger the consistency group until the link is repaired. On the other hand, a link between WAN blades (for example, across a network) may be handled in a number of ways that do not cause the consistency group to trigger. For example, a temporary failure of a link from a WAN blade coupled to a primary storage device to WAN blade coupled to a secondary storage device may be handled by journaling the writes to the WAN blade of a primary storage device. When this occurs, the primary storage device could still receive acknowledgement from WAN blade coupled thereto. Thus, the WAN blade may be used as a temporary buffer to compensate for network failures.

Of course, once the journal fills up (overflows), the WAN blade of the primary storage device may no long acknowledge writes by the primary storage device. In addition, in some instances (such as when the journal is stored in volatile memory), it is possible to clear the entire journal in the event that the journal overflows. In connection with clearing the journal, the WAN blade may send messages to the primary storage device to invalidate previously written (and acknowledged) tracks.

Note also that, in some instances, peer-to-peer recovery may be possible. If a first link between devices is down, an affected device could still receive data via some other link, if it exists, and/or could receive the data from some other source, such as another one of the secondaries.

Figure 16:
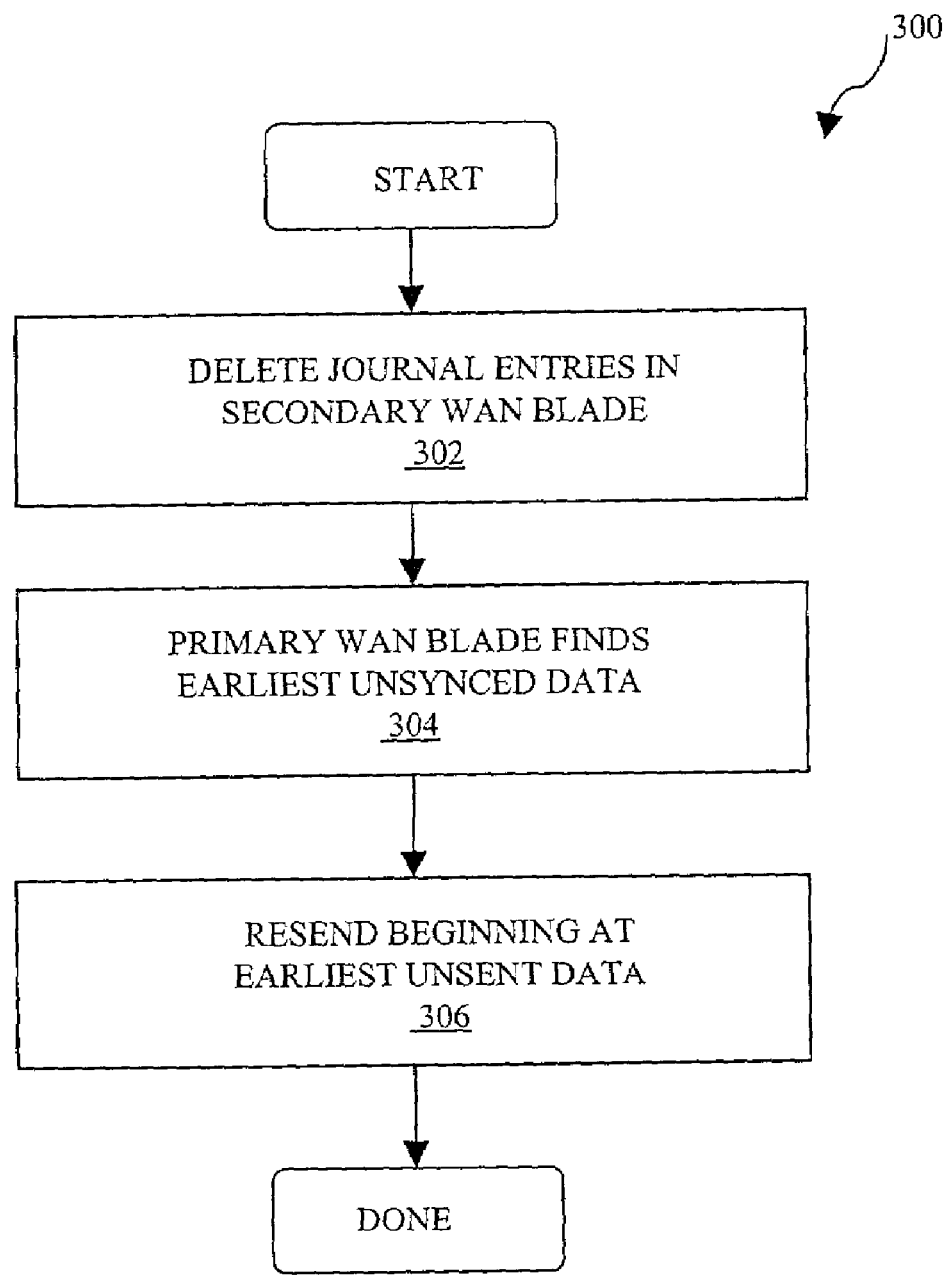
FIG. 16 is a flowchart illustrating steps for recovery in connection with failure in a consistency group.

Referring to FIG. 16, a flow chart 300 illustrates steps performed in connection with data recovery of a consistency group. Data recovery is used in instances where a communication link becomes non-operational or some other portion of the equipment fails. Processing begins at a first step 302 where all data journal entries of all of the WAN blades coupled to secondary storage devices are deleted. Any data stored in a journal corresponding to a secondary storage device has not yet been synchronized, and thus will be resent in connection with data recovery.

Following the step 302 is a step 304 where the WAN blade(s) coupled to the primary storage device search for the earliest journal entries (i.e., journal entries with the lowest sequence number) that have not yet been synchronized. For embodiments where journal entries in the WAN blade coupled to the primary storage device are deleted upon synchronization (e.g., as described above in connection with the step 280 of FIG. 15), then processing at the step 304 simply determines the earliest entries in the journal. Following the step 304 is a step 306 where the WAN blade coupled to the primary storage device proceeds with recovery by resending data starting from the earliest journal entries determined at the step 304. Following the step 306, processing is complete.

Figure 17:
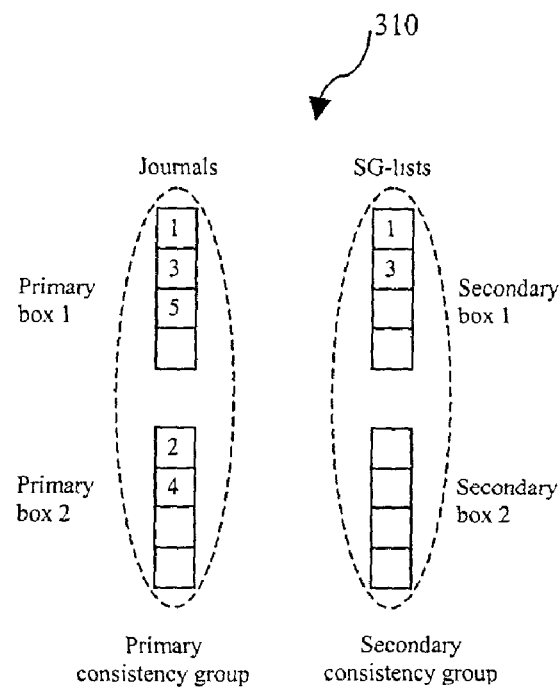
FIG. 17 is a diagram illustrating implementation of delayed journal deletion and recovery.

Referring to FIG. 17, a diagram 310 illustrates distribution of journal entries. The label "SG-lists" refers to journals on the WAN blade corresponding to the secondary storage device. In the example of the diagram 310, only journal entries 1 and 3 have been propagated to the secondary storage device. Thus, if the consistency group triggers, the WAN blade corresponding to secondary box one will delete journal entry 3 since journal entry 2 is not present. Note that the primary WAN blade should be able to resend journal entry 2, which should not have been acknowledged by the WAN blade corresponding to the secondary storage device, and thus should not have been deleted yet from the journal of the WAN blade corresponding to the primary storage device.

Figure 18:
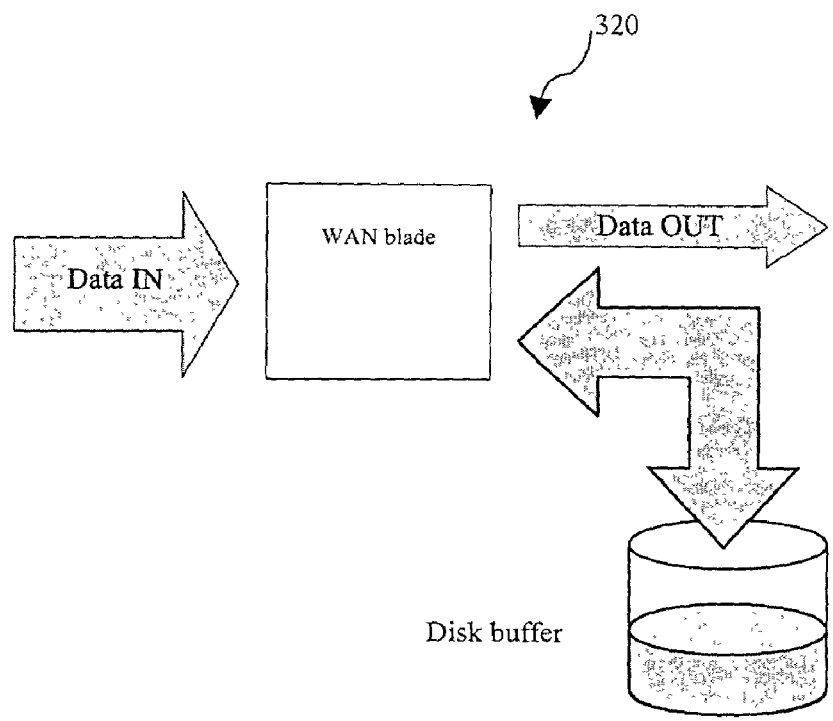
FIG. 18 is a diagram illustrating an effect of using a journal (disk buffer) with a WAN blade.

Referring to FIG. 18, a diagram 320 illustrates a WAN blade using a Disk buffer (i.e., journal) to handle different maximum throughput rates with respect to data provided to the WAN blade from the corresponding storage device (e.g., Data IN) and data provided from the WAN blade to other WAN blades via, for example, a network (e.g., Data OUT). The Disk buffer may be used to temporarily store any data provided to the WAN blade that can not be immediately sent from the WAN blade.

In some instances, an application may repair files that are incomplete due to any one of a variety of unforeseen circumstances, such as a system crash. However, often the ability to repair incomplete files relies, at least in part, on the data being written to the file in the order that the data was provided by the application. That is, if an application writes block 1, block 2, and then block 3 to a file, the application may be able to repair the file if the system crashes at any time during the process. However, the application may have difficulty repairing a file if data is written to the file in a different order than the data had been provided by the application. For example, if an application writes block 1, block 2, and then block 3, in that order, the application may have difficulty repairing a file if, for some reason, the file storage system writes block 2, block 3, and then block 1, in that order.

As discussed above, it is sometime useful to restart an application on a host coupled to a storage device that was previously a secondary storage device but which is subsequently converted to a primary storage device. However, in such instances, the application may have to repair files in which a multiblock write operation was interrupted by the event or events that created the situation where the application needed to be restarted on the secondary storage device. In such cases, it is useful to have ordered writes where data has been provided to the secondary storage device in the same order that the data was written by the application. Having the order writes increases the likelihood that any partially written files may be repaired by the application.

In another situation, called cascaded RDF, a primary storage device provides data to a first secondary storage device using synchronous mode where every write by the host to the primary storage device is acknowledged only after the data has been successfully transferred to the first secondary storage device. The first secondary storage device is located relatively geographically close to the primary storage device to facilitate synchronous communication between the two. A second secondary storage device is coupled to the first secondary storage device using semi-synchronous RDF so that the two secondary storage devices may be geographically separated. Thus, a catastrophic failure may damage both the primary storage device and the first secondary storage device (which are relatively close to facilitate synchronous RDF communication), but leave the second secondary storage device unharmed. Note, however, that the WAN blade discussed herein may replace the first secondary storage device. Thus, the primary storage device would provide data to the WAN blade which would provide data to the (geographically separate) secondary storage device, thus addressing the previous need for two secondary storage devices in a cascaded RDF configuration.

While the invention has been disclosed in connection with various embodiments, modifications thereon will be readily apparent to those skilled in the art. Accordingly, the spirit and scope of the invention is set forth in the following claims.

What is claimed is:

1. A method of transferring data from a first storage device to a second storage device, comprising:
synchronously transferring the data from the first storage device to a first buffer device;
asynchronously transferring the data from the first buffer device to a second buffer device;

synchronously transferring the data from the second buffer device to the second storage device, wherein the first buffer device acknowledges successful transfer of the data to the first storage device prior to the first buffer device completing transfer of the data to the second buffer device; and providing the data from the first buffer device to the second buffer device using a network, wherein the data is provided from the first storage device in a first format and is provided to the network in a second format that is different from the first format, wherein the first buffer device converts the data from the first format to the second format and sends the data in the second format to the network, and wherein the second buffer device receives the data in the second format from the network and converts the data from the second format into the first format before the data is transferred to the second storage device;

wherein the first format is RDF format and the second format is one of TCP/IP or UDP.

2. The method of claim 1, wherein the second storage device receives the data in the RDF format different from the TCP/IP or UDP format used to transmit the data over the network.

3. The method of claim 1, wherein the first buffer device acknowledges successful transfer of the data to the first storage device prior to all of the data being provided to the network.

4. A computer program product, implemented in a computer readable medium, that transfers data from a first storage device to a second storage device, comprising:

executable code that synchronously transfers the data from the first storage device to a first buffer device;

executable code that asynchronously transfers the data from the first buffer device to a second buffer device;

executable code that synchronously transfers the data from the second buffer device to the second storage device, wherein the first buffer device acknowledges successful transfer of the data to the first storage device prior to the first buffer device completing transfer of the data to the second buffer device; and executable code that provides the data from the first buffer device to the second buffer device using a network, wherein the data is provided from the first storage device in a first format and is provided to the network in a second format that is different from the first format, wherein the first buffer device converts the data from the first format to the second format and sends the data in the second format to the network, and wherein the second buffer device receives the data in the second format from the network and converts the data from the second format into the first format before the data is transferred to the second storage device;

wherein the first format is RDF format and the second format is one of TCP/IP or UDP.

5. The computer program product of claim 4, wherein the second storage device receives the data in the RDF format different from the TCP/IP or UDP format used to transmit the data over the network.

6. The computer program product of claim 4, wherein the first buffer device acknowledges successful transfer of the data to the first storage device prior to all of the data being provided to the network.

7. A method of transmitting data from a first storage device to a second storage device, comprising:

the second storage device receiving the data from the first storage device; and the first storage device providing the data to the second storage device using a network, wherein the data is acknowledged to the first storage device as being successfully received at the second storage device prior to all of the data being provided to the network, wherein the data is provided from the first storage device in a first format and is provided to the network in a second format that is different from the first format, wherein the first storage device converts the data from the first format to the second format and sends the data in the second format to the network, and wherein the second storage device receives the data in the second format from the network and converts the data from the second format into the first format;

wherein the first format is RDF format and the second format is one of TCP/IP or UDP.

8. A device that transmits data from a first storage device to a second storage device, comprising:

first means for the second storage device to receive the data from the first storage device; and second means for the first storage device to provide the data to the second storage device using a network, wherein the data is acknowledged to the first storage device as being successfully received at the second storage device prior to all of the data being provided to the network, wherein the data is provided from the first storage device in a first format and is provided to the network in a second format that is different from the first format, wherein the second means converts the data from the first format to the second format and sends the data in the second format to the network, and wherein the first means receives the data in the second format from the network and converts the data from the second format into the first format;

wherein the first format is RDF format and the second format is one of TCP/IP or UDP.

9. A computer program product, implemented in a computer readable medium, that transmits data from a first storage device to a second storage device, comprising:

executable code that causes the second storage device to receive the data from the first storage device;

executable code that causes the first storage device to provide the data to the second storage device using a network, wherein the data is acknowledged to the first storage device as being successfully received at the second storage device prior to all of the data being provided to the network, wherein the data is provided from the first storage device in a first format and is provided to the network in a second format that is different from the first format;

executable code that causes the first storage device to convert the data from the first format to the second format and send the data in the second format to the network; and executable code that causes the second storage device to receive the data in the second format from the network and convert the data from the second format into the first format;

wherein the first format is RDF format and the second format is one of TCP/IP or UDP.

* * * * *